United States Patent
Nambara (10) Patent No.: US 10,732,419 B2
(45) Date of Patent: Aug. 4, 2020

(54) HEAD-UP DISPLAY

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 101 days.

(21) Appl. No.: 16/095,419

(22) PCT Filed: Feb. 28, 2017

(86) PCT No.: PCT/JP2017/007588
§ 371 (c)(1),
(2) Date: Oct. 22, 2018

(87) PCT Pub. No.: WO2017/187758
PCT Pub. Date: Nov. 2, 2017

(65) Prior Publication Data
US 2019/0137767 A1 May 9, 2019

(30) Foreign Application Priority Data
Apr. 26, 2016 (JP) .................. 2016-088313

(51) Int. Cl.
*G02B 27/01* (2006.01)
*B60K 35/00* (2006.01)

(52) U.S. Cl.
CPC .......... *G02B 27/0179* (2013.01); *B60K 35/00* (2013.01); *G02B 27/01* (2013.01); *B60K 2370/334* (2019.05); *G02B 2027/011* (2013.01); *G02B 2027/013* (2013.01); *G02B 2027/0183* (2013.01)

(58) Field of Classification Search
CPC ..... G02B 27/0179; G02B 27/01; B60K 35/00
USPC ........................................... 359/630
See application file for complete search history.

(56) References Cited

U.S. PATENT DOCUMENTS 6,504,518 B1   1/2003  Kuwayama et al.
2010/0271698 A1*  10/2010  Kessler .............. G02B 27/0103
                                                     359/479
2015/0338649 A1   11/2015  Nambara

FOREIGN PATENT DOCUMENTS

| JP | H06067154 U | 9/1994 |
| JP | H10115797 A | 5/1998 |
| JP | 2011128500 A | 6/2011 |
| JP | 2014215459 A | 11/2014 |
| JP | 5831434 B2 | 12/2015 |

\* cited by examiner

*Primary Examiner* — James R Greece
(74) *Attorney, Agent, or Firm* — Harness, Dickey & Pierce, P.L.C.

(57) ABSTRACT

A head-up display device is configured to project a display light, which is to be reflected by a concave image forming reflection surface, onto a combiner having the image forming reflection surface a combiner to display a virtual image visible to an occupant. The combiner is located above an upper surface portion of the instrument panel. The projector is configured to project a display light in the form of a light beam. A light guide mirror has a light guide reflection surface and is configured to reflect the display light from the projector toward the image forming reflection surface. The light guide reflection surface is convex.

3 Claims, 4 Drawing Sheets

HEAD-UP DISPLAY

CROSS REFERENCE TO RELATED APPLICATIONS

This application is a U.S. National Phase Application under 35 U.S.C. 371 of International Application No. PCT/JP2017/007588 filed on Feb. 28, 2017. This application is based on and claims the benefit of priority from Japanese Patent Application No. 2016-088313 filed on Apr. 26, 2016. The entire disclosures of all of the above applications are incorporated herein by reference.

TECHNICAL FIELD

The present disclosure relates to a head-up display device configured to display a virtual image visually recognized by an occupant.

BACKGROUND ART

Conventionally, a head-up display device (hereinafter abbreviated as HUD device) configured to display a virtual image visually recognized by an occupant has been known. An HUD device disclosed in Patent Literature 1 includes a projector, a light guide mirror, and a combiner having an image forming reflection surface. The projector projects a display light in the form of a light beam. The light guide mirror has a planar light guide reflection surface that reflects the display light from the projector toward the image forming reflection surface. The image forming reflection surface of the combiner reflects the display light from the light guide mirror.

When the HUD device described above is mounted on an instrument panel of a vehicle, it would be preferable to place the image forming reflection surface of the combiner above an upper surface portion of the instrument panel in consideration of the visibility (for example, movement of a line of sight) of the virtual image.

In addition, as a reflection angle of the display light on the image forming reflection surface of the combiner increases, the virtual image would be distorted asymmetrically vertically, for example. For that reason, it is conceivable to reduce an increase in the reflection angle of the display light on the image forming reflection surface.

However, in the image forming reflection surface of the large-sized light guide mirror as disclosed in Patent Literature 1, since the degree of freedom of placement is low, it would be difficult to reflect the display light toward the image forming reflection surface placed above the upper surface portion while reducing an increase in the reflection angle.

PRIOR TECHNICAL LITERATURE

Patent Literature

Patent Literature 1: JP2014-215459A

SUMMARY OF INVENTION

It is an object of the present disclosure to provide an HUD device with high visibility of a virtual image.

As described above, in the image forming reflection surface of the large-sized light guide mirror as disclosed in Patent Literature 1, since the degree of freedom of placement is low, it would be difficult to reflect the display light toward the image forming reflection surface placed above the upper surface portion while reducing an increase in the reflection angle. Therefore, the present inventors have studied a reduction in the size of the light guide mirror.

Specifically, the present inventors have considered that when the image forming reflection surface of the combiner is concaved and a radius of curvature of the concave surface is reduced, the size of the light guide mirror can be reduced because a light beam of the display light incident on the image forming reflection surface can be downsized. However, when the light guide mirror having a planar light guide reflection surface as in Patent Literature 1 is employed, there is a need to install the projector in the vicinity of the light guide mirror, for example. When the projector is installed in the vicinity of the light guide mirror, for example, a concern that the light beam that has been reflected on the light guide reflection surface interferes with the projector or the like occurs, which affects the visibility of the virtual image.

According to one aspect of the present disclosure, a head-up display device configured to project a display light, which is to be reflected on a concave image forming reflection surface, onto a combiner having the concave image forming reflection surface and to display a virtual image visible to an occupant. The combiner is mounted on an instrument panel of a vehicle and located above an upper surface portion of the instrument panel. The head-up display device comprises a projector configured to project the display light in a form of a light beam. The head-up display device further comprises a light guide mirror including a light guide reflection surface configured to reflect the display light from the projector toward the image forming reflection surface. The light guide reflection surface is convex.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, an embodiment of the present disclosure will be described with reference to the drawings.

Figure 1:
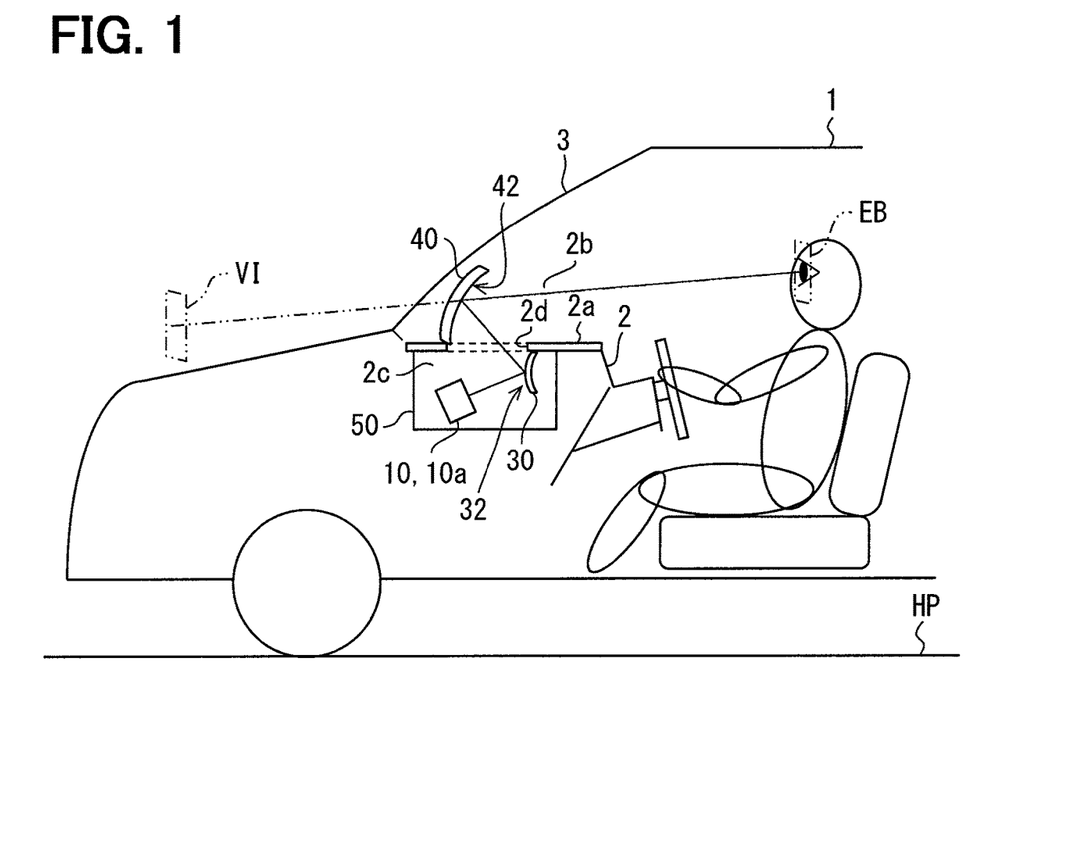
FIG. 1 is a schematic diagram illustrating an installed state of an HUD device in a vehicle according to an embodiment.

As illustrated in FIG. 1, an HUD device 100 according to an embodiment of the present disclosure is mounted in an instrument panel 2 of a vehicle 1 that is one type of a moving object. The HUD device 100 projects a display light onto a combiner 40 as a projection member and causes the display light to reach a visible region EB provided in a vehicle interior of the vehicle 1 while causing the display light to be reflected on an image forming reflection surface 42 of the combiner 40. As a result, the HUD device 100 displays a virtual image VI visible to an occupant In other words, the display light is perceived as the virtual image VI by the occupant of the vehicle 1 whose eyes are positioned within the visible region EB in the vehicle interior of the vehicle 1. The occupant is capable of recognizing various pieces of information which are displayed as the virtual image VI. Examples of various pieces of information which is displayed as the virtual image VI include vehicle state values such as vehicle speed and remaining fuel level, or vehicle information such as road information and visibility auxiliary information.

The visible region EB is a space region in which the virtual image VI displayed by the HUD device 100 is visible. In other words, if the occupant's eyes fall within the visible region EB, the virtual image VI can be visually recognized, and if the occupant's eyes fall outside the visible region EB, the visibility of the virtual image VI becomes difficult as compared with the former.

In the following description according to the present embodiment, the significance of upward or downward indicating a positional relationship is determined by comparing heights from a horizontal plane HP with each other when the vehicle 1 is positioned on the horizontal plane HP.

A specific configuration of the HUD device 100 described above will be described below. The HUD device 100 includes a projector 10, a light guide mirror 30, and a combiner 40. Among those components, the projector 10 and the light guide mirror 30 are housed in a housing 50 of the HUD device 100.

Figure 2:
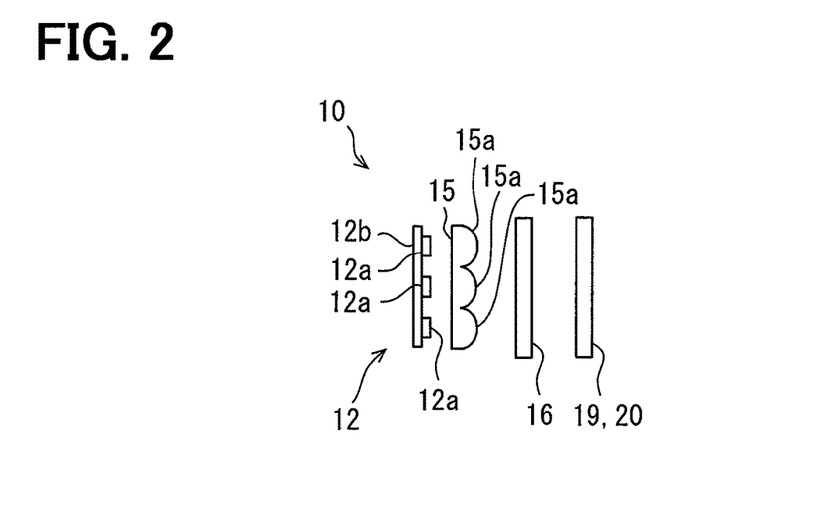
FIG. 2 is a schematic view illustrating a configuration of a projector according to the embodiment.

As shown in FIG. 2, the projector 10 includes a light source unit 12, a condensing unit 14, and an optical opening portion 20, and those components are accommodated in a box-shaped casing 10a (refer to FIG. 1).

The light source unit 12 includes multiple light emitting devices 12a (for example, three) such as light emitting diode devices. The multiple light emitting devices 12a are located on a light source circuit board 12b and are connected to a power supply through a wiring pattern on the light source circuit board 12b. Each of the light emitting devices 12a emits a light with an amount of light emission corresponding to a current amount by energization. More specifically, in each of the light emitting devices 12a, for example, a blue diode is covered with a phosphor, to thereby realize a light emission with pseudo white.

The condensing unit 14 is located between the light source unit 12 and the optical opening portion 20, and includes a condenser lens 15 and a field lens 16. The condenser lens 15 is located between the light source unit 12 and the field lens 16 and made of a synthetic resin, glass or the like to have a light transmissive property. In particular, the condenser lens 15 according to the present embodiment is a lens array in which multiple convex lens elements 15a are arrayed according to the number and placement of the light emitting devices 12a. The condenser lens 15 condenses the light incident from the light source unit 12 side and emits the condensed light toward the field lens 16 side.

The field lens 16 is located between the condenser lens 15 and the optical opening portion 20, and is made of a synthetic resin, glass or the like to have a light transmissive property. In particular, the field lens 16 according to the present embodiment is a Fresnel lens formed in a plate-like shape. The field lens 16 further condenses the light incident from the condenser lens 15 side and emits the condensed light toward the optical opening portion 20 side.

It is to be noted that other configurations can be employed as long as the light condensing unit 14 condenses the light emitted from the light source unit 12. For example, the light condensing unit 14 may be configured by one lens or a mirror, and may be configured by adding a lens, a mirror, a diffusion plate, or other optical elements to the configuration described above.

The optical opening portion 20 is optically opened to cause a part of the light emitted from the light source unit 12 to be transmitted through the optical opening portion 20 to form an image, and projects the image as the display light toward the light guide mirror 30 on an opposite side to the light source unit 12 and the light condensing unit 14.

More specifically, the optical opening portion 20 according to the present embodiment is formed by an active matrix transmissive liquid crystal panel 19 using a thin film transistor (TFT). In the optical opening portion 20 described above, as shown in FIGS. 3 and 4, multiple liquid crystal pixels 22 are arrayed in a two-dimensional direction. Since the array of the liquid crystal pixels 22 is shaped in a rectangle as a whole, the optical opening portion 20 optically opens with an outer contour in a rectangular shape.

Figure 4:
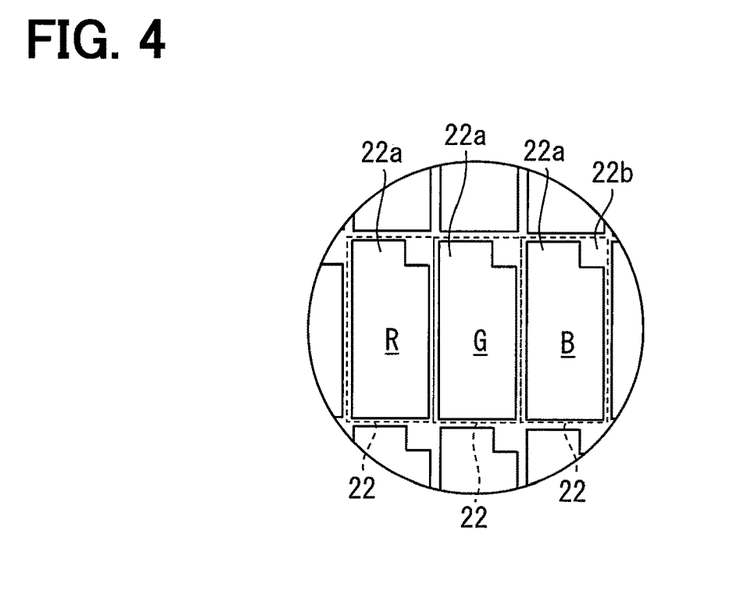
FIG. 4 is an enlarged view illustrating a portion VI in FIG. 3.

Further, as shown in detail in FIG. 4, each of the liquid crystal pixels 22 is provided with an opening region 22a provided so as to penetrate in the normal direction of the optical opening portion 20 and a wiring region 22b provided so as to surround the opening region 22a.

In a portion including the opening region 22a of the optical opening portion 20, a pair of polarizing plates, a liquid crystal layer that is sandwiched between the pair of polarizing plates, and so on are laminated on each other. Each of the polarizing plates has a property of transmitting the light polarized in a predetermined direction and absorbing the light polarized in a direction substantially perpendicular to the predetermined direction. The pair of polarizing plates is located substantially orthogonal to each other in the respective predetermined directions. The liquid crystal layer can rotate a polarization direction of the light incident on the liquid crystal layer according to an applied voltage by applying the voltage for each liquid crystal pixel. A ratio of the light transmitted through the later polarizing plate due to the rotation of the polarization direction, that is, a transmittance can be changed.

Figure 3:
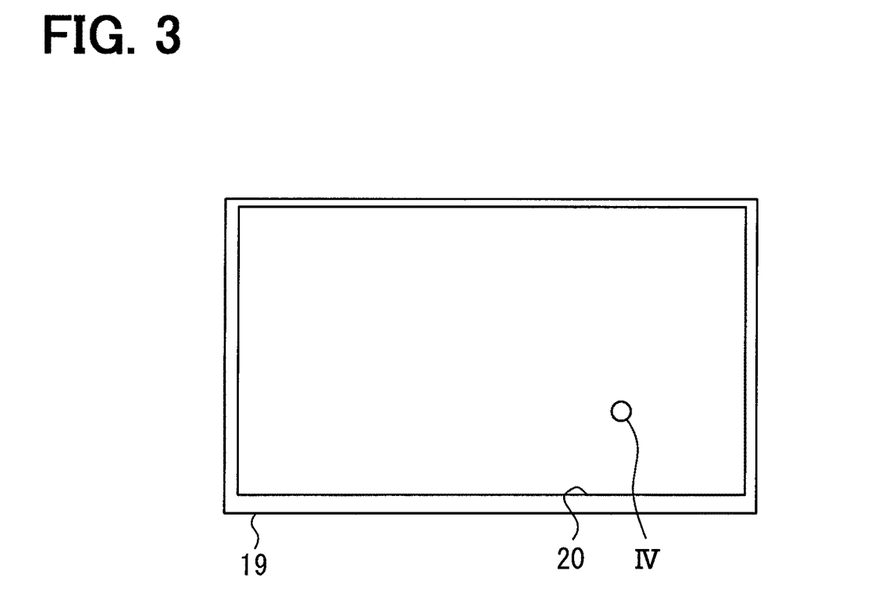
FIG. 3 is a schematic view of an optical opening portion as viewed along a normal direction of the optical opening portion according to the embodiment.

The light incident on the array of the liquid crystal pixels 22 in the optical opening portion 20 from the light condensing unit 14 side is controlled in the transmittance of the light for each of the liquid crystal pixels 22, as a result of which, an image is formed. Color filters of mutually different colors (for example, red, green, and blue) are provided in the adjacent liquid crystal pixels 22, and various colors are reproduced by a combination of those color filters.

In this way, the projector 10 projects the display light in the form of a light beam through the optical opening portion 20. The display light projected by the projector 10 is made incident on the light guide mirror 30.

As shown in FIG. 1, the light guide mirror 30 is a mirror for guiding the display light from the side of the optical opening portion 20 to the combiner 40, and is located on an optical path between the optical opening portion 20 and the combiner 40. In particular, the light guide mirror 30 according to the present embodiment is located below the upper surface portion 2a of the instrument panel 2 and at a position adjacent to the upper surface portion 2a. The light guide mirror 30 is formed by evaporating aluminum as a light guide reflection surface 32 on a surface of a base material made of a synthetic resin, glass, or the like. The light guide reflection surface 32 of the light guide mirror 30 is convexly curved to have a smooth convex shape. The display light incident from the side of the optical opening portion 20 is reflected by the light guide reflection surface 32. The reflected display light passes through an opening window 2d which opens so as to communicate a lower region 2c which is lower than the upper surface portion 2a with an upper region 2b which is higher than the upper surface portion 2a, and is made incident on the image forming reflection surface 42 of the combiner 40.

The combiner 40 is made of a synthetic resin, glass or the like, and shaped, for example, in a light transmissive plate-shape extending upward from inside the housing 50. The combiner 40 has an image forming reflection surface 42 located above the upper surface portion 2a and on a surface on a side facing the light guide mirror 30 and the visible region EB. The image forming reflection surface 42 is curved in a concave shape to provide a smooth concave surface shape. The display light incident from the light guide reflection surface 32 is reflected toward the visible region EB by the image forming reflection surface 42. The occupant can visually recognize the virtual image VI by the display light of the image that has reached the visible region EB in that manner.

In this example, the combiner 40 is located closer to the visible region EB than the windshield 3. Therefore, the occupant can visually recognize a scenery outside the vehicle including a road, road signs and the like through the light transmissive combiner 40 and the windshield 3. In other words, the virtual image VI to be visually recognized is superimposed and displayed on the scenery outside the vehicle.

The optical system configured by the HUD device 100 capable of performing the superimposed display described above will be described in detail below with reference to FIG. 5.

Hereinafter, in the optical path of the optical system shown in FIG. 5, a distance from the virtual image VI to the visible region EB is defined as Id (Id<0 for the virtual image), a distance from the visible region EB to the image forming reflection surface 42 is defined as Ed (Ed>0), a distance from the image forming reflection surface 42 to the light guide reflection surface 32 is defined as L3 (L3>0), and a distance from the light guide reflection surface 32 to the optical opening portion 20 is L4.

Further, an optical power of the light guide reflection surface 32 is defined as φ1 (φ1<0) and an optical power of the image forming reflection surface 42 is defined as φ2 (φ2>0). A focal length of the light guide reflection surface 32 is defined as f1=1/φ1, and a focal length of the image forming reflection surface 42 is defined as f2=1/φ2. It is assumed that a combined focal length of the image forming reflection surface 42 and the light guide reflection surface 32 is positive.

In addition, a half value of the size of the virtual image VI is defined as Is, a half value of the size of the visible region EB is defined as Es, and a half value of the size of the optical opening portion 20 is defined as Os (Os<0 provided that an image formed at the optical opening 20 is a real image.

In the present embodiment, the light source unit 12 and the visible region EB are substantially optically conjugate with each other. In each parameter, the visible region EB can be replaced with a conjugate point CP optically conjugate with the light source unit 12. For example, the distance Id can be understood as a distance between the conjugate point CP and the virtual image VI, and the half value Es of the size of the visible region EB can be understood as a light beam radius of the display light at the conjugate point CP (specifically, the entire display light projected from the projector 10).

In the optical system described above, an angle of an image paraxial ray IMR and a height of the image paraxial ray IMR are sequentially obtained by back ray tracing from the visible region EB to the optical opening portion 20 side. In this example, the angle of the image paraxial ray IMR expresses an angle at which a light ray (hereinafter referred to as an image paraxial ray IMR) along a direction connecting an end of the visible region EB and a center of the virtual image VI between the visible region EB and the image forming reflection surface 42 spans relative to a light ray (hereinafter referred to as a principal ray PRR) that passes through a center (for example, the conjugate point CP) of the visible region EB and a center of the optical opening portion 20. In the following description, the angle of the image paraxial ray IMR is described in units of radians. The height of the image paraxial ray IMR is a distance between the principal ray PRR and the image paraxial ray IMR along the direction perpendicular to the principal ray PRR.

The angle of the image paraxial ray IMR is −Es/Id between the visible region EB and the image forming reflection surface 42, which is set as an HUD constant A. On the image forming reflection surface 42, the height of the image paraxial ray IMR is Es+Ed−(Es/Id), which is set as an HUD constant B. The angle of the image paraxial ray IMR is A+B−φ2 between the image forming reflection surface 42 and the light guide reflection surface 32. On the light guide reflection surface 32, the height of the image paraxial ray IMR is B−L3−(A+B−φ2). The angle of the image paraxial ray IMR is (A+B−φ2)+(B−L3−(A+B−φ2))−φ1 between the light guide reflection surface 32 and the optical opening portion 20.

In the optical opening portion 20, since the height of the image paraxial ray IMR is 0, the distance L4 can be expressed by a formula shown in the following Expression 1.

$$L4 = \frac{B - L3 \cdot (A + B \cdot \phi 2)}{(A + B \cdot \phi 2) + \{B - L3 \cdot (A + B \cdot \phi 2)\} \cdot \phi 1} \quad [\text{Expression 1}]$$

Since the optical opening portion 20 should not be located between the light guide reflection surface 32 and the image forming reflection surface 42 on the optical path, there is a need to satisfy the condition of L4>0. Therefore, the condition shown in the following Expression 2 is derived.

$$\frac{B - L3 \cdot (A + B \cdot \phi 2)}{(A + B \cdot \phi 2) + \{B - L3 \cdot (A + B \cdot \phi 2)\} \cdot \phi 1} > 0 \quad [\text{Expression 2}]$$

Next, an angle of a pupil paraxial ray PUR and a height of the pupil paraxial ray PUR are sequentially obtained by back ray tracing from the visible region EB to the optical opening portion 20 side. In this example, the angle of the pupil paraxial ray PUR is an angle at which a light ray (hereinafter referred to as pupil paraxial ray PUR) along a direction connecting a center of the visible region EB and an end portion of the virtual image VI between the viewing region EB and the image forming reflection surface 42 spans relative to the principal ray PRR. The height of the pupil paraxial ray PUR is an interval between the principal ray PRR and the pupil paraxial ray PUR along a direction perpendicular to the principal ray PRR.

The angle of the pupil paraxial ray PUR corresponds to a half angle of view θ of the virtual image VI between the visible region EB and the image forming reflection surface 42, and is θ=−Is/Id, which is set as an HUD constant C. On the image forming reflection surface 42, the height of the pupil paraxial ray PUR is −Ed−θ, which is set as an HUD constant D. The angle of the pupil paraxial ray PUR is C+D−φ2 between the image forming reflection surface 42 and the light guide reflection surface 32. In the light guide reflection surface 32, the height of the pupil paraxial ray PUR is D−(C+D−φ2)·L3. The height of the pupil paraxial ray PUR is (C+D−φ2)+{D−(C+D−φ2)·L3}−φ1 between the light guide reflection surface 32 and the optical opening portion 20. In the optical opening 20, the height of the pupil paraxial ray PUR is D−(C+D−φ2)·L3−L4−[(C+D−φ2)+ {D−(C+D−φ2)·L3}−φ1], which coincides with a half value Os of the size of the optical opening portion 20.

In the optical system, since a pupil distance Pd from the optical opening portion 20 to a position ENP of an entrance pupil can be obtained by obtaining a distance at which the height of the pupil paraxial ray PUR becomes 0, the pupil distance Pd can be expressed by an Expression shown by the following Expression 3.

$$Pd = \frac{D - (C + D \cdot \phi 2) \cdot L3 - L4 \cdot}{[(C + D \cdot \phi 2) + \{D - (C + D \cdot \phi 2) \cdot L3\} \cdot \phi 1]} \quad \text{[Expression 3]}$$
$$\frac{}{(C + D \cdot \phi 2) + \{D - (C + D \cdot \phi 2) \cdot L3\} \cdot \phi 1}$$

In order to reduce the size of the light guide reflection surface 32, it is preferable that the position ENP of the entrance pupil exists closer to the light guide reflection surface 32 side than the optical opening portion 20. In other words, since Pd<0 is established, the condition shown in the following Expression 4 is derived.

$$\frac{D - (C + D \cdot \phi 2) \cdot L3 - L4 \cdot [(C + D \cdot \phi 2) + \{D - (C + D \cdot \phi 2) \cdot L3\} \cdot \phi 1]}{(C + D \cdot \phi 2) + \{D - (C + D \cdot \phi 2) \cdot L3\} \cdot \phi 1} < 0 \quad \text{[Expression 4]}$$

The results of designing the optical system of the HUD device 100 so as to establish the condition indicated in Expression 2 and the condition indicated in Expression 4 will be shown in detail in Table 1 below. As a precondition, the distance Id corresponding to the display distance of the virtual image VI is set to −1800 mm. If the distance L4 is extremely large, the HUD device 100 becomes large in size and is little likely to be mounted. Therefore, for example, the distance L4 is set to be in a range of 100 to 110 mm.

TABLE 1

| Element | Focal Length | Surface Spacing | Image Paraxial Ray Tracing Result | |
|---|---|---|---|---|
| | | | Light Ray Angle | Light Ray Height |
| Virtual Image VI | Plane | Id = −1800 | 0.022222 | 0 |
| Visible Region EB | Plane | Ed = 775 | 0.022222 | 40 |
| Image Forming Reflection Surface | f2 = 166 | L3 = 91 | 0.159438 | 22.77777 |
| Light Guide Reflection Surface | f1 = −102 | L4 = 105.512 | 0.07837 | 8.26894 |

TABLE 1-continued

| Element | Focal Length | Surface Spacing | Image Paraxial Ray Tracing Result | |
|---|---|---|---|---|
| | | | Light Ray Angle | Light Ray Height |
| Optical opening Portion | Plane | −777.658 | 0.07837 | 0 |
| Entrance Pupil | Plane | — | | |

As compared with the design of Table 1, the design results of a comparative example HUD device 900 (refer to FIG. 6) adopting a light guide reflection surface 932 in which the light guide reflection surface 32 is replaced by a planar one are shown in detail in the following Table 2.

TABLE 2

| Element | Focal Length | Surface Spacing | Image Paraxial Ray Tracing Result | |
|---|---|---|---|---|
| | | | Light Ray Angle | Light Ray Height |
| Virtual Image VI | Plane | Id = −1800 | 0.022222 | 0 |
| Visible Region EB | Plane | Ed = 775 | 0.022222 | 40 |
| Image Forming Reflection Surface | f2 = 235 | L3 = 91 | 0.119149 | 22.77777 |
| Light Guide Reflection Surface | Plane | L4 = 100.1706 | 0.119149 | 11.9352 |
| Optical opening Portion | Plane | 146.0979 | 0.119149 | 0 |
| Entrance Pupil | Plane | — | | |

In the columns of "focal length" in Tables 1 and 2, "plane" means that the focal length can be regarded as infinite or that no refracting action and no reflecting action exist in the corresponding "element". Therefore, in the HUD devices 100 and 900, the existence of a field curvature of the displayed virtual image VI is not denied.

In addition, in the column of "spacing" in Tables 1 and 2, a spacing between an element of the same row and an element of one row below the subject element is shown, and in the column of "light ray angle" of Tables 1 and 2, an angle of the image paraxial ray IMR between an element of the same row and an element of one row below the subject element is shown. In the columns of "light ray height" in Tables 1 and 2, the height of the image paraxial ray IMR in the element of the same row is shown.

Comparing the design results shown in Table 1 with the design results shown in Table 2, the "light ray height" in the light guide reflection surface 932 in the comparative example is 11.9352 mm whereas the "ray height" of the light guide reflection surface 32 in the present embodiment is 8.26894 mm. In other words, in the present embodiment compared to the comparative example, the spread of the display light shaped in the light beam contributing to imaging of the virtual image VI is reduced. Therefore, the size of the light guide reflection surface 32 can be reduced.

Further, the "focal length" of the image forming reflection surface 42 is 166 mm in the present embodiment while the focal length is 235 mm in the comparative example. On the other hand, although not shown in Tables 1 and 2, a virtual image magnification is 3.526636 in the present embodiment while the virtual image magnification is 5.361702 in the comparative example. Therefore, in the present embodiment, since the virtual image magnification is smaller than that in the comparative example despite the fact that the focal length of the image forming reflection surface 42 is set to be shorter than that of the comparative example, the resolution of the virtual image VI can be increased successfully.

Figure 5:
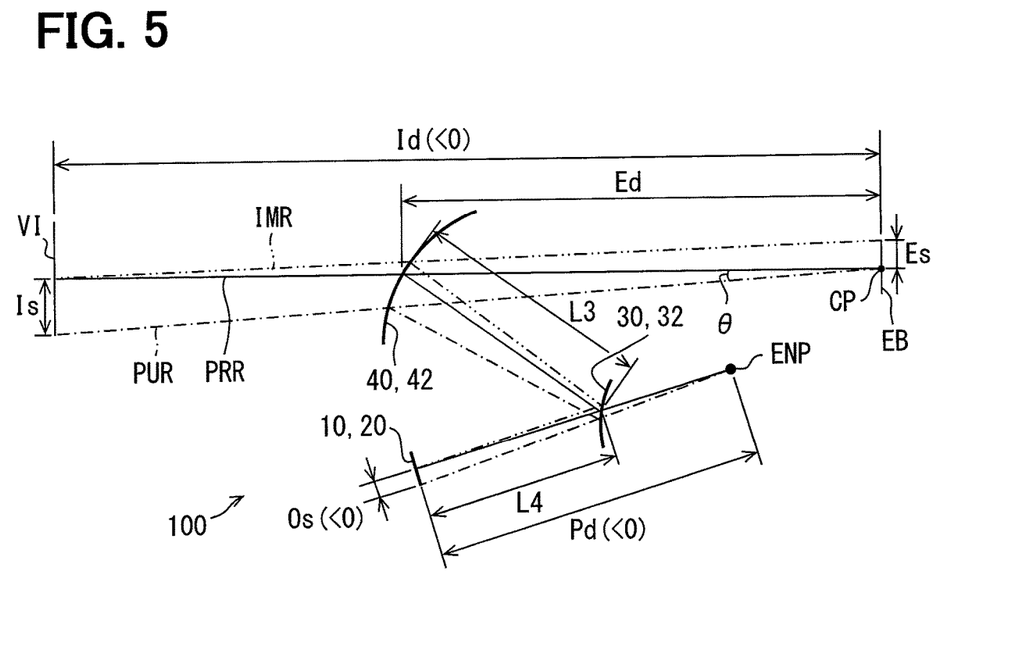
FIG. 5 is a diagram schematically illustrating an optical system by the HUD device according to the embodiment.
Figure 6:
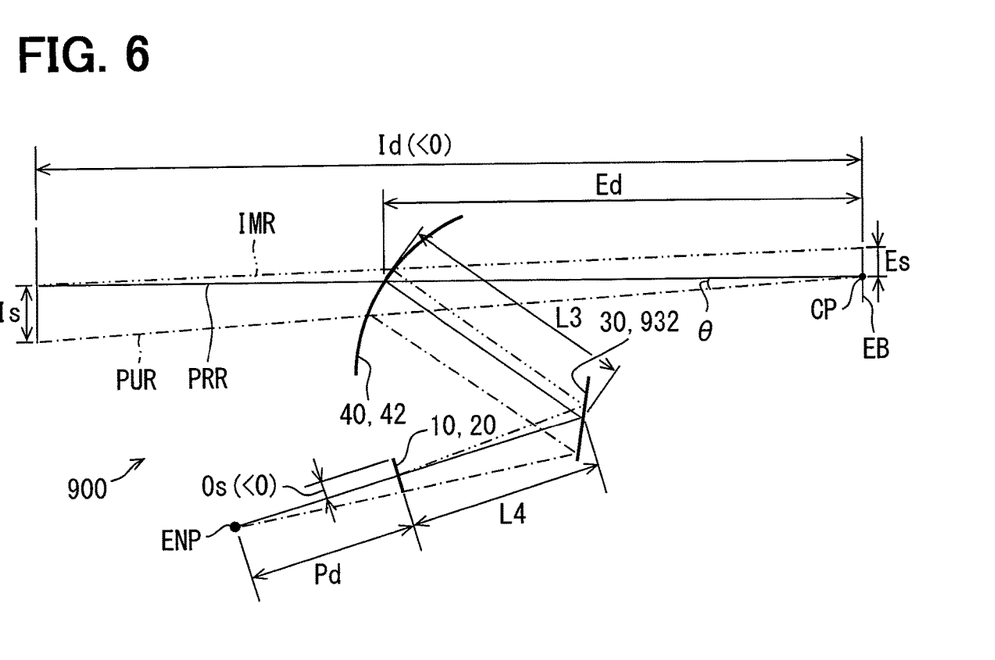
FIG. 6 is a diagram schematically illustrating an optical system by an HUD device according to a comparative example.

FIGS. 5 and 6 schematically show the optical system, and the shapes and dimensional relations of the respective elements 20, 32, 932, and 42, the directions of the respective light rays PRR, IMR, and PUR, the angle of reflection, the position of the position ENP of the entrance pupil, and so on are not necessarily accurate. In addition, in FIG. 5, the position ENP of the entrance pupil is shown on the extended line of the principal ray PRR from the optical opening portion 20 for convenience in order to illustrate the pupil distance Pd.

(Operational Effects)

The operational effects according to the present embodiment described above will be described below.

According to the present embodiment, the display light projected from the projector 10 is reflected by the convex light guide reflection surface 32 and travels toward the concave image forming reflection surface 42. Therefore, even if the projector 10 is not brought closer to the light guide mirror 30, a divergence angle of the light beam of the display light directed from the light guide reflection surface 32 to the image forming reflection surface 42 can be set to be large. In other words, the light beam of display light until the light beam is incident on the image forming reflection surface 42 can be downsized. Thus, even if the size of the light guide reflection surface 32 is reduced, the light guide mirror 30 can reliably guide the display light. Since the size of the light guide mirror 30 can be reduced, the degree of freedom of placement of the light guide mirror 30 is increased.

Therefore, in the HUD device 100 mounted on the instrument panel 2, even with a configuration in which the display light is guided from the light guide reflection surface 32 of the light guide mirror 30 to the image reflection surface 42 placed above the upper surface portion 2a, the placement of the light guide mirror 30 capable of reducing an increase in the reflection angle of the display light on the image forming reflection surface 42 can be realized by reducing the size of the light guide mirror 30. With the reduction in the increase in the reflection angle, for example, a distortion of the virtual image VI occurring asymmetrically vertically can be reduced. As described above, the HUD device 100 with high visibility of the virtual image VI can be provided.

According to the present embodiment, a combined focal length of the image forming reflection surface 42 and the light guide reflection surface 32 is positive. Therefore, the convex light guide reflection surface 32 and the concave image forming reflection surface 42 are combined together, thereby being capable of realizing an enlargement of the virtual image VI while reducing the field curvature.

According to the present embodiment, the light guide mirror 30 having the convex light guide reflection surface 32 is located below the upper surface portion 2a in a state where the size of the light guide mirror 30 can be reduced. As a result, although an increase in the reflection angle of the display light on the image forming reflection surface 42 is reduced, because the occupant of the vehicle 1 is little likely to virtually recognize the presence of the light guide mirror 30, the appearance of the vehicle 1 can be enhanced.

According to the present embodiment, since the condition shown in Expression 2 is satisfied, the projector 10 can be located at a position deviated from the optical path between the light guide reflection surface 32 and the image forming reflection surface 42.

According to the present embodiment, since the condition shown in Expression 4 is satisfied, the position ENP of the entrance pupil in the optical system of the HUD device 100 can be placed closer to the light guide reflection surface 32 than the projector 10. Therefore, since the light rays effective for visually recognizing the virtual image VI can be converged in a narrow area of the light guide reflection surface 32, the effect of reducing the size of the light guide mirror 30 can be enhanced.

(Reference Example)

As compared with the design of Table 1, the design results of an HUD device 800 (refer to FIG. 7) of a reference example adopting a light guide reflection surface 832 in which the light guide reflection surface 32 is replaced by a concave one while the condition represented by Expression 2 and the condition represented by Expression 4 are established are shown in detail in the following Table 3.

TABLE 3

| Element | Focal Length | Surface Spacing | Image Paraxial Ray Tracing Result | |
|---|---|---|---|---|
| | | | Light Ray Angle | Light Ray Height |
| Virtual Image VI | Plane | Id = −1800 | 0.022222 | 0 |
| Visible Region EB | Plane | Ed = 775 | 0.022222 | 40 |
| Image Forming Reflection Surface | f2 = 81.5 | L3 = 91 | 0.301704 | 22.77777 |
| Light Guide Reflection Surface | f1 = 14 | L4 = 144.4112 | −0.03239 | −4.6773 |
| Optical opening Portion | Plane | −144.334 | −0.03239 | 0 |
| Entrance Pupil | Plane | — | | |

Figure 7:
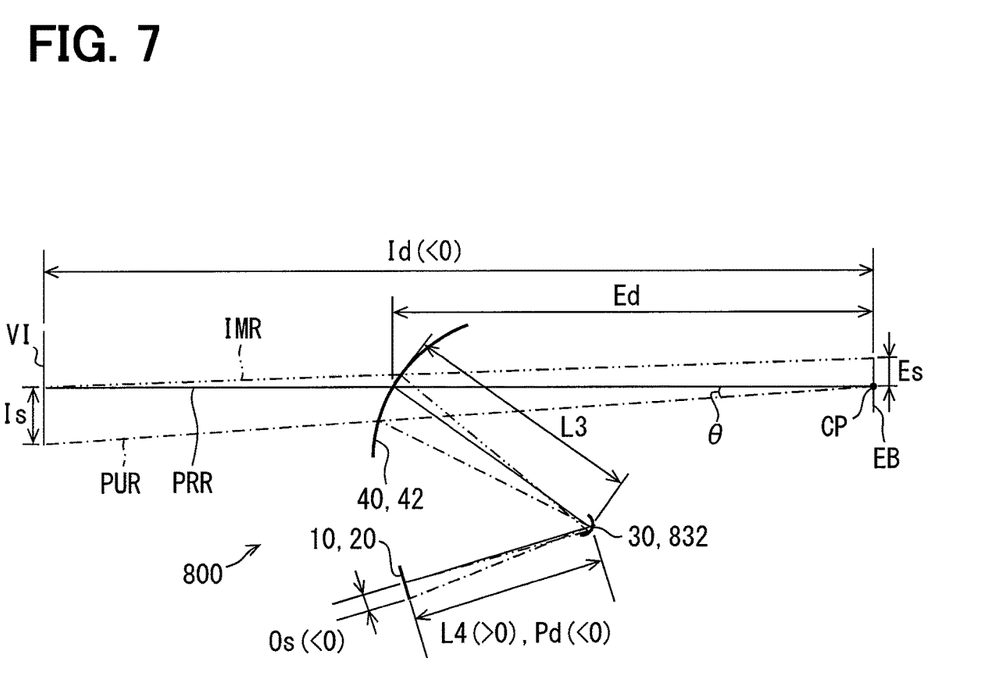
FIG. 7 is a diagram schematically illustrating an optical system by an HUD device according to a reference example.

According to the design results shown in Table 3, the focal length of the light guide reflection surface 832 is extremely small as f1=14 mm. This is because the position of the position ENP of the entrance pupil in the optical system of the HUD device 800 is located in the vicinity of the light guide reflection surface 832. In other words, in the optical system shown in Table 3, after the display light has been imaged as a real image in the vicinity of the light guide reflection surface 832, the real image is displayed as the virtual image VI at a predetermined position (for example, a position where an interval Id=−1800 mm is satisfied) with the use of the reflection on the image forming reflection surface 42. In order to establish a virtual image VI displayed farther than the image forming reflection surface 42, a condition of L3>f1 is necessary and the focal length of the light guide reflection surface 832 has to be reduced.

In the light guide reflection surface 832 described above, since a variation in the focal length due to the manufacturing error is large, the quality of the virtual image VI becomes unstable. Therefore, as shown in Table 1, it is more preferable to adopt the convex light guide reflection surface 32.

FIG. 7 schematically show the optical system, and the shapes and dimensional relations of the respective elements 20, 832, and 42, the directions of the light ray, the angle of reflection, the position ENP of the entrance pupil, and so on are not necessarily accurate.

Other Embodiments

The present disclosure is not construed as limited to the embodiment, and can be applied to various embodiments within the scope not departing from the gist of this disclosure.

Specifically, as a modification 1, the whole of the light guide mirror 30 may not be located below the upper surface portion 2a. For example, a part of the light guide mirror 30 may be located so as to protrude upward from the upper surface portion 2a.

In Modification 2, the combiner 40 having the image forming reflection surface 42 may have semi-translucency or may have no light transmissive property due to coloring or the like.

As Modification 3, the combiner 40 having the image forming reflection surface 42 may be provided separately from the HUD device 100.

As Modification 4, the optical opening portion 20 may be located in a state in which the normal direction is inclined with respect to the principal ray PRR.

The head-up display device described above displays the virtual image VI visible to the occupant by projecting the display light reflected by the concave image forming reflection surface 42 onto the combiner 40 mounted on the instrument panel 2 of the vehicle 1 and having the image forming reflection surface 42 located above an upper surface portion 2a of the instrument panel. The head-up display device includes the projector 10 for projecting the display light in the form of a light beam and the light guide mirror 30 having the light guide reflection surface 32 for reflecting the display light from the projector toward the image forming reflection surface. The light guide reflection surface is convex.

According to the above disclosure, the display light projected from the projector is reflected by the convex light guide reflection surface and travels toward the concave image forming reflection surface. Therefore, even if the projector is not brought closer to the light guide mirror, a divergence angle of the light beam of the display light directed from the light guide reflection surface to the image forming reflection surface can be set to be large. In other words, the light beam of display light until the light beam is incident on the image forming reflection surface can be downsized. Thus, even if the size of the light guide reflection surface is reduced, the light guide mirror can reliably guide the display light. Since the size of the light guide mirror can be reduced, the degree of freedom of placement of the light guide mirror is increased.

Therefore, in the HUD device mounted on the instrument panel, even with a configuration in which the display light is guided from the light guide reflection surface of the light guide mirror to the image reflection surface placed above the upper surface portion, the placement of the light guide mirror capable of reducing an increase in the reflection angle of the display light on the image forming reflection surface can be realized by reducing the size of the light guide mirror. With the reduction in the increase in the reflection angle, for example, a distortion of the virtual image occurring asymmetrically vertically can be reduced. As described above, the HUD device with high visibility of the virtual image can be provided.

The present disclosure has been described based on the embodiments; however, it is understood that this disclosure is not limited to the embodiments or the structures. The present disclosure includes various modification examples and modifications within the equivalent range. In addition, it should be understood that various combinations or aspects, or other combinations or aspects, in which only one element, one or more elements, or one or less elements are added to the various combinations or aspects, also fall within the scope or technical idea of the present disclosure.

What is claimed is:

1. A head-up display device configured to project a display light, which is to be reflected on a concave image forming reflection surface, onto a combiner having the concave image forming reflection surface and to display a virtual image visible to an occupant, the combiner mounted on an instrument panel of a vehicle and located above an upper surface portion of the instrument panel, the head-up display device comprising:

a projector configured to project the display light in a form of a light beam; and
    a light guide mirror including a light guide reflection surface configured to reflect the display light from the projector toward the image forming reflection surface, wherein
    the light guide reflection surface is convex, wherein
    the projector includes:
    a light source unit configured to emit a light; and
    an optical opening portion optically opened and configured to allow the light emitted from the light source unit to pass through the opening to form an image and to project the image as the display light, wherein
    an optical power of the light guide reflection surface is defined as $\phi 1$,
    an optical power of the image forming reflection surface is defined as $\phi 2$,
    a distance between the image forming reflection surface and the light guide reflection surface is defined as L3,
    a distance between a conjugate point optically conjugate with the light source unit and the virtual image visually recognized from the conjugate point is defined as Id which is a value smaller than zero,
    a light beam radius of the display light at the conjugate point is defined as Es,
    $-$Es/Id is defined as A and Es+Ed$-$(Es/Id) is defined as B, and
    the following expression is established, $$\frac{B - L3 \cdot (A + B \cdot \phi 2)}{(A + B \cdot \phi 2) + \{B - L3 \cdot (A + B \cdot \phi 2)\} \cdot \phi 1} > 0 \qquad \text{[Expression 2]}$$

a distance between the light guide reflection surface and the optical opening portion is defined as L4,
    a half angle of view of the virtual image is defined as $\theta$,
    $\theta$ is defined as C,
    $-$Ed$-\theta$ is defined as D, and
    the following expression is established, $$\frac{D - (C + D \cdot \phi 2) \cdot L3 - L4 \cdot [(C + D \cdot \phi 2) + \{D - (C + D \cdot \phi 2) \cdot L3\} \cdot \phi 1]}{(C + D \cdot \phi 2) + \{D - (C + D \cdot \phi 2) \cdot L3\} \cdot \phi 1} < 0. \qquad \text{[Expression 4]}$$

2. The head-up display device according to claim 1, wherein
    a combined focal length of the image forming reflection surface and the light guide reflection surface is positive.

3. The head-up display device according to claim 1, wherein
    the light guide mirror is located below the upper surface portion.

* * * * *